United States Patent [19]

Mahan

[11] Patent Number: 5,107,620

[45] Date of Patent: * Apr. 28, 1992

[54] ELECTRIFIED TABLE CLOTH

[76] Inventor: Richard E. Mahan, 14027 Brownwood St., #3, Houston, Tex. 77015

[*] Notice: The portion of the term of this patent subsequent to May 9, 2006 has been disclaimed.

[21] Appl. No.: 518,429

[22] Filed: May 3, 1990

[51] Int. Cl.$^5$ ............................................. H05C 3/00
[52] U.S. Cl. ........................................... 43/112; 43/98
[58] Field of Search ................... 43/112, 98, 107, 121; 361/232

[56] References Cited

U.S. PATENT DOCUMENTS

| | | | |
|---|---|---|---|
| 4,756,116 | 7/1988 | Cutter | 43/112 |
| 4,827,874 | 5/1989 | Mahan | 119/61 |
| 4,869,015 | 9/1989 | Murakami | 43/112 |
| 4,949,216 | 8/1990 | Djukastein | 361/232 |

FOREIGN PATENT DOCUMENTS

| | | | |
|---|---|---|---|
| WO8803754 | 6/1988 | PCT Int'l Appl. | 43/112 |
| 597751 | 4/1978 | Switzerland | 43/112 |

*Primary Examiner*—Richard K. Siedel
*Assistant Examiner*—Chuck Y. Mah
*Attorney, Agent, or Firm*—Neal J. Mosely

[57] ABSTRACT

An electrified table cloth for preventing crawling insects from gaining access to the consumer's food or drink comprises a cloth formed of electrically insulated material which has at least one pair of parallel electrically conductive strips secured to the edge or border of the cloth to completely encircle the cloth and which are connected to a low voltage DC battery also secured to the cloth. The strips of electrical conductive material are spaced apart sufficiently to normally prevent completion of a circuit across the strips and for completion of a circuit across said strips through an insert's body as the insect attempts to traverse the strips when crawling acorss the edge of the cloth. The current passing through the insect's body is sufficient to produce a sensation which will discourage further travel across the edge of the cloth. A consumer who may come into contact with the strips will usually not feel the current and, even if the consumer is wet, the current will produce only a slight tingling sensation. The electrical apparatus may also be provided in kit form to be installed on table cloths by the consumer.

9 Claims, 1 Drawing Sheet

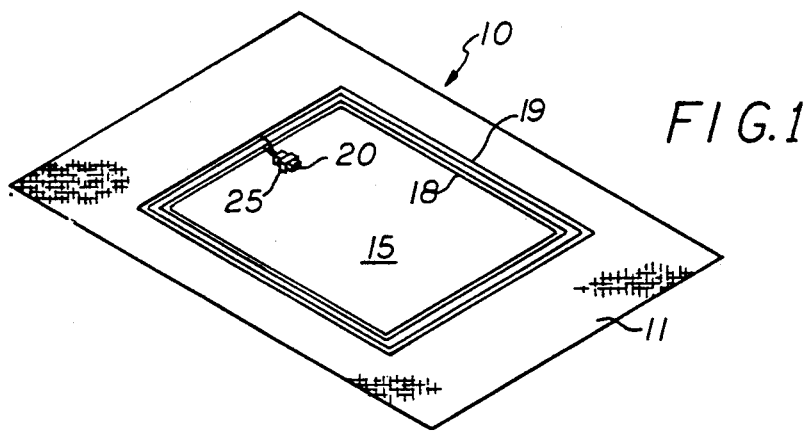
FIG.1
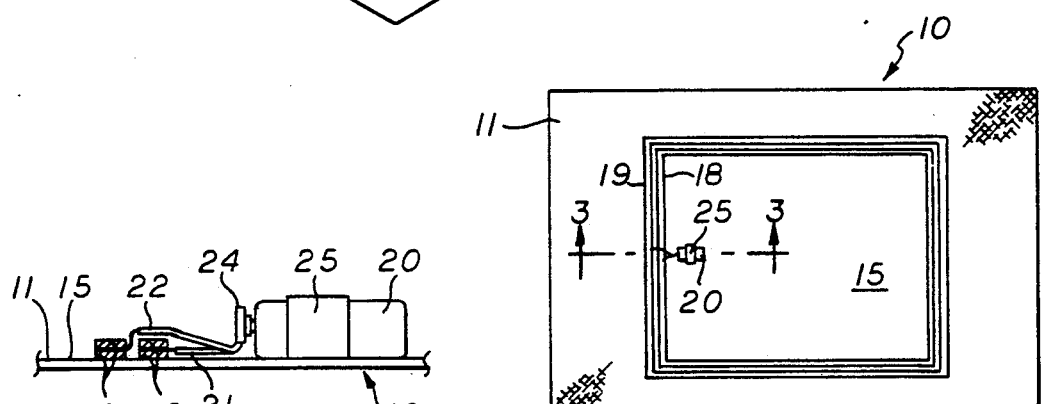
FIG.3
FIG.2
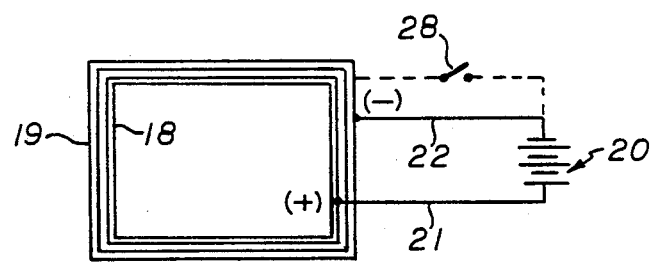
FIG.4
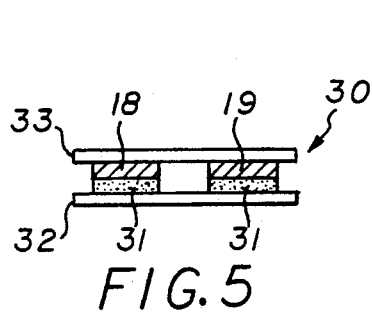
FIG.5
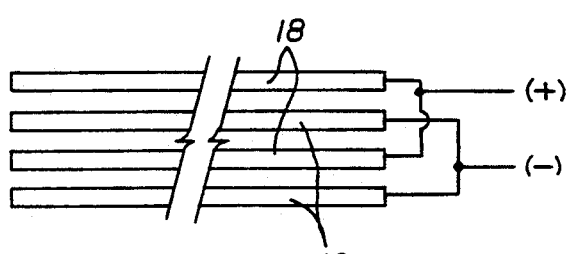
FIG.6

ELECTRIFIED TABLE CLOTH

BACKGROUND OF THE INVENTION

1. Field of the Invention

This invention relates generally to electrical insect eradication devices, and more particularly to an electrified table cloth having insect repelling strips.

2. Brief Description of the Prior Art

Devices for the eradication of crawling insects through the use of electricity are known in the art. There are several patents which disclose various devices for the electrical eradication of insects.

Lapierre, U.S. Pat. No. 4,471,561 discloses a base sheet of electrical insulating material which will encircle a structure to be protected. Electrical contacts are embedded in the insulating base sheet except for limited exposed areas on the side of the sheet facing away from the structure. Power is supplied by a low voltage DC battery and converted to pulsating high voltage current at the electrodes by a transformer circuit.

Shanahan et al, U.S. Pat. No. 4,165,577 discloses an electric baseboard trap for crawling insects. An elongated L-shaped base is mounted at the juncture of the wall and floor and has a well at the bottom. Electrical conductor strips are spaced apart on opposite sides of the well so that after an insect touches both conductors it will fall into the well.

Makara, U.S. Pat. No. 3,077,050 discloses a combined ventilation and electrical screen. The screen is formed of perforated flexible insulating material and provided with transverse electrical conduits which are connected to a source of electrical power.

Mahan U.S. Pat. No. 4,827,874 discloses an electrified pet dish for repelling insects.

The present invention is distinguished over the prior art in general, and these patents in particular, by an electrified table cloth for preventing crawling insects from gaining access to the consumer's food or drink. The cloth is formed of electrically insulated material and has at least one pair of parallel electrically conductive strips secured to the edge or border of the cloth to completely encircle the cloth which are connected to a low voltage DC battery also secured to the cloth. The strips of electrical conductive material are spaced apart sufficiently to normally prevent completion of a circuit across the strips and for completion of a circuit across said strips through an insect's body as the insect attempts to traverse the strips when crawling across the edge of the cloth. The current passing through the insect's body is sufficient to produce a sensation which will discourage further travel across the edge of the cloth. A consumer who may contact the strips will usually not feel the current, and even if the consumer is wet, the current will produce only a slight tingling sensation. The electrical apparatus may also be provided in kit form to be installed on table cloths by the consumer.

SUMMARY OF THE INVENTION

It is therefore an object of the present invention to provide an electrified table cloth which will effectively deter insects which attempt to crawl onto or across the cloth.

It is another object of this invention to provide an electrified table cloth which will deter insects through the use of electricity, but is not harmful to consumers who may come into contact with the electrical conduits.

Another object of this invention is to provide an electrified table cloth which utilizes electricity efficiently allowing the use of an inexpensive dry cell as the source of electrical power.

Another object of this invention is to provide an electrified table cloth which includes spaced bands of electrodes surrounding the cloth and means for creating sufficient voltage across the electrodes only when an insect attempts to cross the electrodes by utilizing the insect's body as a conductor.

Another object of this invention is to provide an electrified table cloth which operates continuously for long periods of time without care and maintenance.

A further object of this invention is to provide an electrified table cloth which may be selectively activated to preserve the life of the battery.

A still further object of this invention is to provide an electrified table cloth which is attractive in appearance, simple in design, inexpensive to manufacture, and rugged and durable in use.

Other objects of the invention will become apparent from time to time throughout the specification and claims as hereinafter related.

The above noted objects and other objects of the invention are accomplished by an electrified table cloth for preventing crawling insects from gaining access to the consumer's food or drink. The cloth is formed of electrically insulated material and has at least one pair of parallel electrically conductive strips secured to the edges or border of the cloth to completely encircle the cloth which are connected to a low voltage DC battery also secured to the cloth. The strips of electrical conductive material are spaced apart sufficiently to normally prevent completion of a circuit across the strips and for completion of a circuit across said strips through an insect's body as the insect attempts to traverse the strips when crawling across the edge of the cloth. The current passing through the insect's body is sufficient to produce a sensation which will discourage further travel across the edge of the cloth. A consumer who may come into contact with the strips will usually not feel the current, and even if the consumer is wet, the current will produce only a slight tingling sensation. The electrical apparatus may also be provided in kit form to be installed on table cloths by the consumer.

BRIEF DESCRIPTION OF THE DRAWINGS

FIG. 1 is an isometric view of an electrified table cloth in accordance with the present invention.

FIG. 2 is a top plan view of an electrified table cloth in accordance with the present invention.

FIG. 3 is an enlarged detail of a portion of the electrified table cloth surface taken along Line 3—3 of FIG. 2 showing the electrical conductors installed thereon.

FIG. 4 is a schematic electrical diagram of the electrical circuitry of the electrified table cloth.

FIG. 5 is a greatly enlarged transverse cross section of the electrical strips in a peel and stick form.

FIG. 6 is a partial elevation of the electrical strips showing the electrical connection.

DESCRIPTION OF THE PREFERRED EMBODIMENT

Referring to the drawings by numerals of reference, there is shown in FIGS. 1-3 an electrified table cloth 10 having a table cloth 11. The table cloth 10 represents a common table cloth shape used for supporting containers of food and/or drink.

The following description will utilize the electrified table cloth 10 of FIG. 1 for purposes of illustration. The electrified table cloth 10 is formed of suitable electrical insulating material, such as cloth or plastic. The cloth 11 has a surface 15 to support containers of food or drink.

A series of vertically spaced metallic strips 18 and 19 are secured to the surface of the table cloth 15 to encircle the cloth periphery near the outer edge. The strips 18 and 19 serve as electrical contacts. In the illustrated example, strip 18 represents the positive contact and strip 19 represents the negative contact. Electrical power is supplied to the strips by a low voltage DC battery 20. It has been found that a small 9 volt battery provides sufficient voltage for the intended purpose. Rechargeable batteries may also be used. For purposes of illustration, two strips are shown, but it should be understood that multiple strips may also be used, as shown in FIG. 6, wherein the alternating strips would be connected to one terminal of a battery and the interspaced strips connected to the other terminal of the battery.

The metallic strips 18 and 19 are formed of thin flexible electrical conductive material, such as aluminum foil or tin foil. The strips are connected to wires 21 and 22. The other ends of the wires are connected to a connector 24 which is releasably attached to the terminals of the battery 20.

A battery clip or elastic loop 25 may be secured on the surface of the cloth in a suitable location to releasably secure the battery 20 to the cloth. The wires 21 and 22 may also be secured to the surface of the table cloth 15 by suitable means, such as a strip of tape, to prevent them from becoming loosened or pulled from contact with the conductor strips 18 and 19.

The circuitry of the electrical system is shown in FIG. 4, and may include a switch 28 between the battery 20 and one of the conductors 18 or 19. The switch 28 allows the circuitry to be selectively activated when desired to preserve the life of the battery.

The metallic strips 18 and 19 are secured to the surface of the table cloth 15 by suitable means, such as adhesive, glue, or a suitable bonding agent. As shown in FIG. 5, the metallic strips may also be supplied in a peel and stick tape form 30 wherein the metallic strips 18 and 19 are provided with an adhesive backing 31. A strip of waxed paper 32 covers bottom of the tape to protect the adhesive backing 31, and a top strip of paper 33 having a semi-tacky adhesive bottom surface covers the top surface of the metallic strips 18 and 19.

To apply the strips 18 and 19, the assembled tape form 30 is cut to the proper length. The waxed paper 32 is peeled off to expose the adhesive coating 31 and the metallic strips with the semi-tacky paper 33 still attached are applied to the outer edge of the cloth completely encircling it. The semi-tacky paper 33 keeps the parallel strips separated at the proper spacing during the application process. The ends of the metallic strips are overlapped on themselves, and the semi-tacky paper 33 is then removed to expose the outer surface of the metallic strips. As seen in FIG. 3, at one of the overlapped locations the unshielded ends of the wires 21 and 22 are placed on the top surface of the lower strip and are overlapped by the upper or overlapping strip to secure the wires therebetween and make a firm electrical connection. Glue, epoxy, or solder may also be used to further secure the wires to or between the conductive strips. The connector 24 is then connected to the battery terminals. If the circuitry contains a switch, it is turned on. The electrified cloth is then ready for operation. The electrical apparatus may also be provided in kit form to be installed on conventional cloths by the consumer.

OPERATION

As insects, such as roaches or ants, crawl onto the surface of the cloth, they will cross the conductor strips 18 and 19. When this occurs, the insect's body completes a circuit across the conductors. The current passing through the insect's body is sufficient to produce a sensation which will discourage further travel on the tablecloth. A consumer who may come into contact with the strips will usually not feel the current, and even if the consumer is wet, the current will produce only a slight tingling sensation.

While this invention has been described fully and completely with special emphasis upon a preferred embodiment, it should be understood that within the scope of the appended claims the invention may be practiced otherwise than as specifically described herein.

I claim:

1. An electrified table cloth to prevent crawling insects from gaining access to the consumer's food or drink comprising;
   a cloth formed of electrical-insulating material having at least one surface for supporting containers of food or drink,
   at least one first strip of electrical-conducting material secured to the surface of the cloth to completely encircle the cloth,
   at least one second strip of electrical-conducting material secured to the surface of the cloth to completely encircle the cloth and spaced parallel to said first strip, and
   a low voltage DC battery operatively secured to the cloth,
   said first strip of electrical-conducting material being connected to one terminal of said battery and said second strip of electrical-conducting material connected to the other terminal of said battery by electrical leads, and
   said first and second strips of electrical-conducting material spaced apart along their entire length and operable to complete a circuit across said strips through an insect's body as the insect attempts to traverse the strips.

2. A cloth according to claim 1 in which
   said first and second strips of electrically-conducting material comprise;
   a first series of vertically spaced apart strips, and
   a second series of vertically spaced apart strips interposed between and parallel to alternating ones of said first series of strips, and
   said first series connected to one terminal of said battery and said second series connected to the other terminal of said battery.

3. A cloth according to claim 1 in which
   said first and second strips of electrical-conducting material are formed of metallic foil.

4. A cloth according to claim 1 including
   clip means secured on the cloth in a suitable location to releasably receive and retain said battery.

5. A cloth according to claim 1 in which
   said battery is releasably secured to the cloth by adhesive material.

6. A cloth according to claim 1 including
switch means operatively connected between said first or said second strip of electrical-conducting material and one terminal of said battery for selective activation of the electrical circuitry.

7. A cloth according to claim 1 in which
said first and second strips of electrical-conducting material are secured to the surface of the cloth by adhesive material.

8. A cloth according to claim 1 in which
said first and second strips of electrical-conducting material are provided with an adhesive backing for securing same to the surface of the cloth.

9. A cloth according to claim 8 including
a removable strip of waxed paper covering the adhesive backing, and
a removable strip of paper having a semi-tacky adhesive bottom surface covering the outer surface of the strips of electrical-conducting material, and
said strips of electrical-conducting material installed on said cloth by removing said strip of waxed paper to expose the adhesive coating, and with said strip of semi-tacky paper still attached, applying the strips of electrical-conducting material to the outer edges of the cloth to completely encircle it,
at least two adjacent strips of electrical-conducting material making firm contact with opposing electrical leads to the battery, and
said strip of semi-tacky paper then removed to expose the outer surface of said electrical conducting material.

* * * * *